United States Patent Office 3,516,444
Patented June 23, 1970

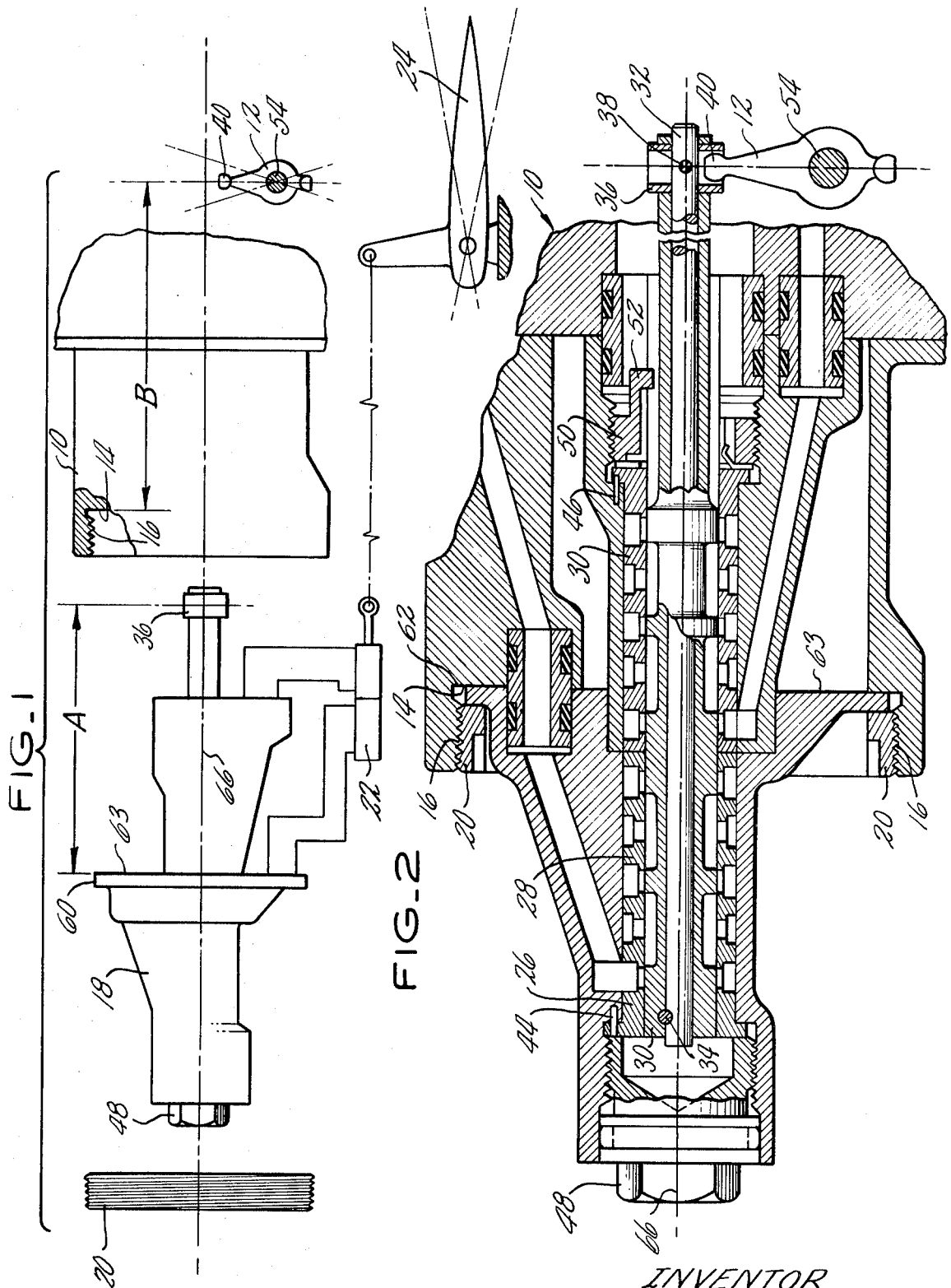

3,516,444
HYDRAULIC CONTROL VALVE
Daniel A. Peck, Wapping, Conn., assignor to United Aircraft Corporation, East Hartford, Conn., a corporation of Delaware
Filed Dec. 6, 1968, Ser. No. 781,736
Int. Cl. F16k *11/07*
U.S. Cl. 137—625.69    4 Claims

ABSTRACT OF THE DISCLOSURE

A hydraulic control system including a spool valve adapted for use in a multiple control system carries on the valve housing a mounting surface that is uniquely located and dimensioned with respect to the spool valve input lever so as to be replaceable by a like spool valve without calibration procedures.

Background of the invention

This invention relates to hydraulic control valves and particularly of the spool type construction adapted for use in a control system and provides means for eliminating the necessity of calibrating the valve when replaced by another like valve unit.

This invention is adapted for use for controlling the control surface such as an elevator, rudder, and the like for aircraft and is a component of overall control system which includes levers, valves, linkages, and the like mounted in a main control housing. Customarily, the control valve may be either mounted in the main housing or in its own housing which is attached to the main housing. Once mounted, it is calibrated on a flow rig so that for a given input signal the control valve will produce a predetermined output. Hence, in an aircraft application where it is employed to control an elevator, a given signal, of say the autopilot, will give a unique position to the elevator. To obtain this unique position from the control valve it is the heretofore practice to calibrate by a flow rig done at the assembly plant the entire control unit prior to being mounted on the aircraft. If for some reason that particular valve has to be replaced, it has been the heretofore known practice to remove the entire control housing, return it to the calibration rig where the valve is replaced and the entire assembly is recalibrated prior to being returned to the aircraft. Obviously, this incurs several disadvantages since it is time consuming to recalibrate the entire control unit; it is costly for doing so and takes the entire control unit off the "line" even though only a single component is at fault. In addition to these disadvantages, the calibration must be done by one skilled in this type of activity, hence requiring that the unit be recalibrated in only certain locations by certain people.

This invention obviates the above-mentioned disadvantages by uniquely dimensioning the control valve so that it can be replaced in the field by a nonskilled artisan and eliminating the need of recalibration when the valve is replaced. As industry has termed this type of component a "line replaceble unit" it will be referred to as such hereinbelow.

Summary of the invention

The primary object of this invention is to provide a line replaceable hydraulic control valve.

A still further object of this invention is to provide in a valve housing a mounting surface uniquely calibrated with relation to the input control lever so that a replaceable unit of the same dimensions can be installed without the necessity of recalibrating the entire control unit.

Other features and advantages will be apparent from the specification and claims and from the accompanying drawings which illustrate an embodiment of the invention.

Brief description of the drawing

FIG. 1 is an exploded view partly in elevation, partly in section, and partly in schematic illustrating the preferred embodiment of this invention.

FIG. 2 is a sectional view illustrating the details of this invention.

Reference is hereby made to FIGS. 1 and 2 showing the details of this invention in its preferred embodiment. It is to be understood that while in the preferred embodiment the invention discloses a dual valve construction, that is, where the left-hand portion of the valve performs the same function as the right-hand portion, it is to be understood that a single valve function, as well as the multiple valve function, is within the scope of this invention.

As best can be seen by referring to FIG. 1 the invention is adapted to be used with a main control system which eventually is mounted on an aircraft (not shown) and includes among other components a main control housing 10 shown as being made in two pieces, input lever 12, mounting flange 14 and internal threads 16. A portion of valve housing 18 fits into a cavity formed in the main control housing 10 and valve spool 30 extends therein to connect with lever 12. Nut member 20 engages threads 16 for clamping housing 18 to the main control housing 10. As schematically illustrated, hydraulic fluid is metered by the control valve 18 to tandem actuator 22 which, in turn, controls flight control surface which in this instance is elevator 24. Obviously, as is well understood in the art, the flight control surfaces are adapted to control the attitude of the aircraft.

Referring next to FIG. 2, axial bore formed in housing 18 receives sleeve 26 which is formed into two identical abutting members 28 and 30 and are fitted thereto in any suitable manner such as by shrink fitting. The spool valve element 30 is pinned to rod 32 by pin 34 and is rigidly connected thereto so as to move rectilinearly therewith. Spool 30 and rod 32 are attached to each other by pins 38 and 34 to provide a dual load path for the spool, such that should a structural failure of either spool 30 or rod 32 ensue, the unit will still function. Bushing 36 rigidly secured to rod 32 by pin 38 is adapted to receive the ball end of end 40 of input lever 12. Spool valve element 30 carries a plurality of lands adapted to cooperate with a plurality of ports formed in the sleeve which communicate with hydraulic flow lines for metering fluid into and out of the actuator 22. Inasmuch as the metering aspect of the valve is not considered to be a portion of this invention and for the sake of simplicity and clarity, a detailed description thereof is completely eliminated. Pins 44 and 46 may be included to prevent rotational movement of the sleeve when the sleeve is locked into position by end cap 48 and the threaded nut member 50. Threaded nut member may carry a downward depending portion 52 for preventing the valve spool from falling out when disassembled from the main housing. Suffice it to say, that when lever 12 is rotated by shaft 54, valve spool 30 responding thereto will move either to the left or to the right for displacing the valve lands relative to the various ports in the valve housing so as to meter fluid to and from the actuator which, in turn, controls the position of elevator 24.

In accordance with this invention the valve housing 18 carries a mounting flange 60 which is adapted to bear against a complementary face 62 formed on flange 14 which flanges are mounted perpendicular to the shaft centerline 66. The wall thickness of flange 60 is varied by facing the end face 63 so as to judiciously establish the distance between it and the centerline of bushing 36 and consequently the centerline of ball 40 so that when the unit is calibrated in a flow rig, there will be a given position of elevator 24 for a given position of lever 12 and a given position of the valve lands of spool 30 relative to the ports in the valve sleeve 28. Hence, once the lever 12 is initially calibrated to establish the distance between it and the locating surface of flange 14, referred to as dimension B in FIG. 1, and once the dimension A is established, an identical valve unit can be replaced in the field without requiring additional calibrations. Hence, all that becomes necessary is for the valve housing 18 and its component parts to be manufactured identical to the original valve and it can be replaced merely by unscrewing the nut element 20, lifting the bushing 36 over ball 40 of lever 12, removing the valve assembly and replacing the new valve assembly in the reverse order.

It should be understood that the invention is not limited to the particular embodiments shown and described herein, but that various changes and modifications may be made without departing from the spirit or scope of this novel concept as defined by the following claims.

I claim:
1. A valve including a valve housing having a ported sleeve therein,
a movable spool within said sleeve and having lands thereon cooperating with ports in the sleeve,
actuating mechanism having a fixed axis and having a lever thereon engaging a portion of the spool remote from and in precise relationship to said lands,
in combination with a main housing on which said valve housing is removably mounted and in which the fixed axis is located,
said main housing having a mounting surface in precise spaced relation to said fixed axis, and
said valve housing having a cooperating mounting surface in precise location to said ports in said sleeve thereby to locate said ports in precise location to said axis when said housings are assembled.
2. A valve as claimed in claim 1 wherein said mounting surface includes a flange formed on said valve housing and having a complementary surface engaging said main housing that includes a plane passing transverse to the centerline of said spool.
3. A vlave as claimed in claim 1 including a bushing fixedly secured to one end of said spool for receiving a ball-like member formed at the end of said lever.
4. A line replaceable valve adapted to cooperate with a control system for positioning a flight control surface of an aircraft,
said valve having a valve housing supporting a ported sleeve,
a valve spool element having a plurality of lands cooperating with the ports of said sleeve for controlling fluid for positioning the flight control surface,
said valve housing having a radially extending flange including a mounting face,
a main control housing supporting an input lever precisely located relative to the position of said flight control surface,
said input lever engaging one end of said valve spool element for imparting rectilinear movement thereto,
said main control housing having a complementary mounting face precisely located relative to said input lever when in a predetermined position for receiving said mounting face of said valve housing,
said mounting face of said valve housing being at a precise location relative to said input lever when in said predetermined position so that said lands are in a precise location relative to their cooperating ports.

References Cited
UNITED STATES PATENTS
3,253,613  5/1966  Richolt _____ 137—625.69 XR HENRY T. KLINKSIEK, Primary Examiner U.S. Cl. X.R.
137—454.5